United States Patent [19]

Blanding

[11] Patent Number: 4,972,079
[45] Date of Patent: Nov. 20, 1990

[54] MOUNT FOR AN OPTICAL DEVICE

[75] Inventor: Douglass L. Blanding, Rochester, N.Y.

[73] Assignee: Eastman Kodak Company, Rochester, N.Y.

[21] Appl. No.: 381,897

[22] Filed: Jul. 19, 1989

[51] Int. Cl.⁵ .............................................. H01J 5/02
[52] U.S. Cl. ................................. 250/239; 250/208.1
[58] Field of Search ..................... 250/239, 578, 208.1

[56] References Cited

U.S. PATENT DOCUMENTS

| | | | |
|---|---|---|---|
| 4,205,349 | 5/1980 | Kawazu et al. | 358/294 |
| 4,318,135 | 3/1982 | Allis et al. | 358/294 |
| 4,381,884 | 5/1983 | Houle | 350/287 |
| 4,412,129 | 10/1983 | Duncan | 250/239 |
| 4,457,017 | 6/1984 | Onogi et al. | 382/65 |
| 4,470,682 | 9/1984 | Suzuki et al. | 354/406 |
| 4,652,095 | 3/1987 | Mauro | 350/531 |
| 4,686,581 | 8/1987 | Spehrley, Jr. et al. | 358/294 |
| 4,859,847 | 8/1989 | Matsuno | 250/239 |

Primary Examiner—David C. Nelms
Assistant Examiner—Sherrie Hsia
Attorney, Agent, or Firm—Donald D. Schaper

[57] ABSTRACT

A mount for an optical device, such as a linear CCD array, is disclosed. The array is mounted on a base which is supported on a frame for adjustment relative thereto. The base is slidably movable on the frame for adjustment of the array in in-track and cross-track directions. The base is movable toward and away from the frame to provide a focus adjustment of the array. In order to provide a mount which can be easily and precisely adjusted to position the array along five degrees of freedom, adjustment screws are positioned such that the position of the array can be changed along one degree of freedom without changing the position of the array along any of the other degrees of freedom.

15 Claims, 4 Drawing Sheets

MOUNT FOR AN OPTICAL DEVICE

BACKGROUND OF THE INVENTION

1. Field of the Invention

This invention relates to a mount for an optical device, and more particularly, to a mount for an image sensor having an array of photosensitive elements.

2. Description of the Prior Art

Image sensors are used in various types of apparatus to form an electronic record of an image. The image sensors include an array of photosensitive elements which must be precisely aligned relative to other elements in the apparatus. Various types of mounts have been developed for supporting the image sensors in apparatus such as scanners, and these mounts normally provide for adjustment in the plane of the sensor as well as adjustment along an optical axis. One of the main problems in known mounts is that considerable skill is required to make the proper adjustments, and thus, the mounts are not suitable for use in applications where skilled technicians are not available to make the adjustments.

In U.S. Pat. No. 4,318,135, there is disclosed an alignment system for scanning arrays. A linear array of photosensitive elements is mounted on a carrier which is in turn attached to a floating block. Threaded members can be moved in engagement with the block to provide adjustment of the array in three degrees of freedom in the plane of the array. The blocks can also be adjusted in a plane perpendicular to the plane of the array by means of axially extending screws. One problem of the mount shown in the patent is that adjustment of any one of the threaded members produces motion of the array in more one degree of freedom. This results in adjustments which are interactive, and thus, adjustment of the position of the array must be an iterative process which is difficult and time consuming.

SUMMARY OF THE INVENTION

It is an object of the present invention to overcome the problems discussed in the prior art above and to provide an improved mount for an optical device.

In accordance with one aspect of the invention, there is provided a mount for an optical device, the mount comprising: means for supporting the device; a plurality of adjustment means which are operable on the device for adjusting the position of the device relative to the supporting means in a plurality of degrees of freedom, each of the adjustment means being operable to adjust the position of the device in one degree of freedom without moving the device in the other degrees of freedom.

In one embodiment of the present invention the mount comprises a base for receiving an optical device, for example, a linear charge-coupled device (CCD) array. The base is fixed to a frame, and means are provided for adjusting the base relative to the frame in five independent degrees of freedom in order to position the linear array in optical apparatus such as a scanner. The frame is adapted to be attached to a structural element in the scanner.

The base is adjustable relative to the frame in the plane of the linear sensor by means of three screws which are threaded through the frame and into contact with the base. The base is held against the screws by a compression spring which is arranged to bias the base into contact with the screws with an equal force on each of the screws. The base can also be adjusted relative to the frame along the optical axis, that is, in a direction perpendicular to the plane of the linear array. The adjustment along the optical axis is accomplished by means of three screws in the frame which bear against the base. Two springs act in an axial direction to bias the base into contact with the three screws.

A principal advantage of the present invention is that adjustments in the position of an optical device can be made along any one of five independent degrees of freedom without displacing the device in the other degrees of freedom. A further advantage of the disclosed optical mount is that it provides a very precise positioning means which is relatively simple and inexpensive to manufacture. The mount disclosed herein is particularly suitable for use in apparatus where a plurality of optical devices must be positioned to interact with a common element, for example, in a scanner in which an object is imaged onto a plurality of CCD arrays.

Other features and advantages will become apparent upon reference to the following Description of the Preferred Embodiment when read in light of the attached drawings.

DESCRIPTION OF THE PREFERRED EMBODIMENT

Figure 1:
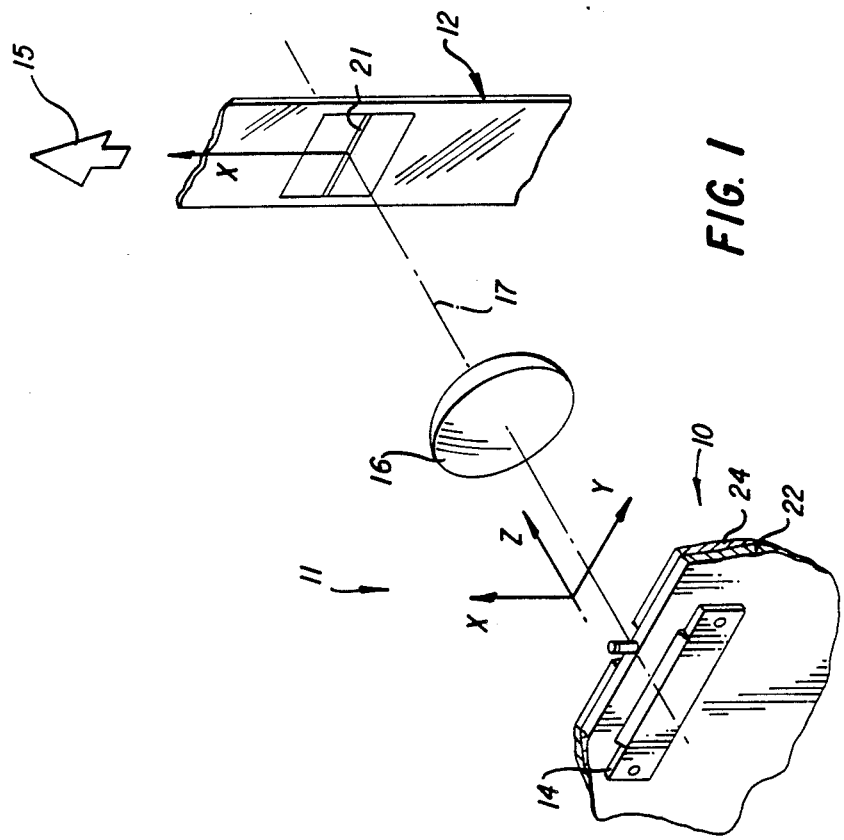
FIG. 1 is a perspective view showing a portion of the mount of the present invention in a film scanner.

With reference to FIG. 1, there is shown a schematic arrangement of a scanner 11 of a type which is adapted to employ an optical mount 10 constructed in accordance with the present invention. The optical mount 10 can be mounted on scanner structure (not shown) such that an area 21 on a film 12 can be imaged by a lens 16 onto a linear array 14 of sensors. As shown in FIG. 1, the film 12 is moved in the direction of arrow 15 to position successive areas of the film 12 along an optical axis 17.

Linear array 14 can be a CCD image sensor which includes a column of photosensitive elements e (FIG. 6) and an adjacent column of CCD's (not shown) which are adapted to shift the signals out of the device. One device which is suitable for use with the present invention is the KLI-5001A/B linear CCD Imager, manufactured by the Eastman Kodak Co., Rochester, N.Y. Array 14 is mounted on a base 22 which is supported on a frame 24. Frame 24 is adapted to be mounted to the scanner suport structure (not shown).

As will be apparent from the discussion which follows, mount 10 can be adjusted along five degrees of freedom. Mount 10 can be adjusted along two degrees of freedom to position elements e in the array in an in-track direction (X axis in FIG. 1), along a third degree of freedom to position the array in a cross-track direction (Y axis E, and along two rotational degrees of freedom to adjust the focus of elements e of the array 14 along the Z axis.

Figure 3:
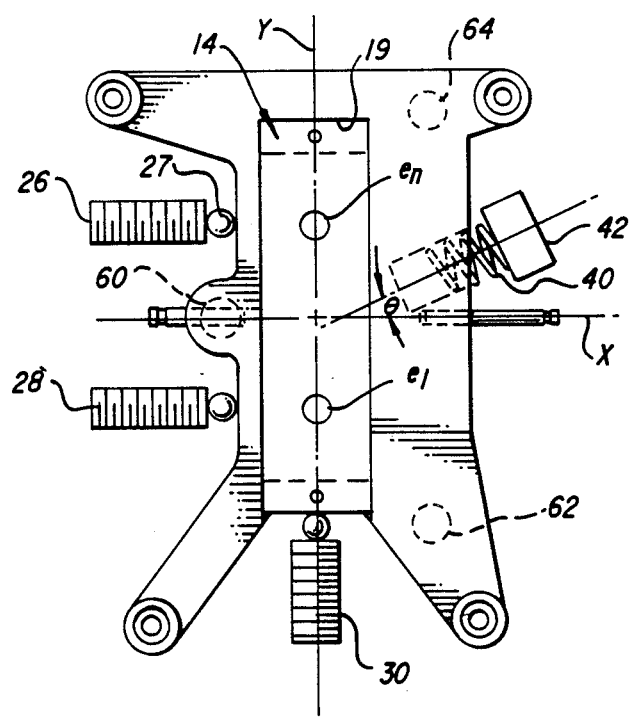
FIG. 3 is a plan view of the mount of the present invention.

Array 14 is received in a cavity 19 in base 22, and adjustments in the plane of the array 19 in base 22, and adjustments in the plane of the array 1 (X and Y axes) can be made by means of screws 26, 28 and 30. Screws 26, 28, and 30 are threadably received in bosses 32, 34 and 36, respectively, on frame 24. As shown in FIG. 3, balls 27 are provided at the ends of screws 26, 28, and 30, in order to reduce friction in the areas of contact with the base 22. It is also possible to omit the balls 27 and to have the screws directly contact the base 22. In a second embodiment of the present invention, shown in FIG. 6 and described below, contact is made with base 22 by means of wire flexures. A compression spring 40 is supported in a cylindrical cavity 41 in base 22, and the spring 40 abuts against a tab 42 on frame 24. Spring 40 is adapted to maintain base 22 in contact with screws 26, 28 and 30. As shown in FIG. 3, the force of spring 40 is directed against base 22 at an angle $\theta$, and angle $\theta$ is calculated such that the spring force on each of the screws 26, 28, and 30 is exactly the same.

Figure 2:
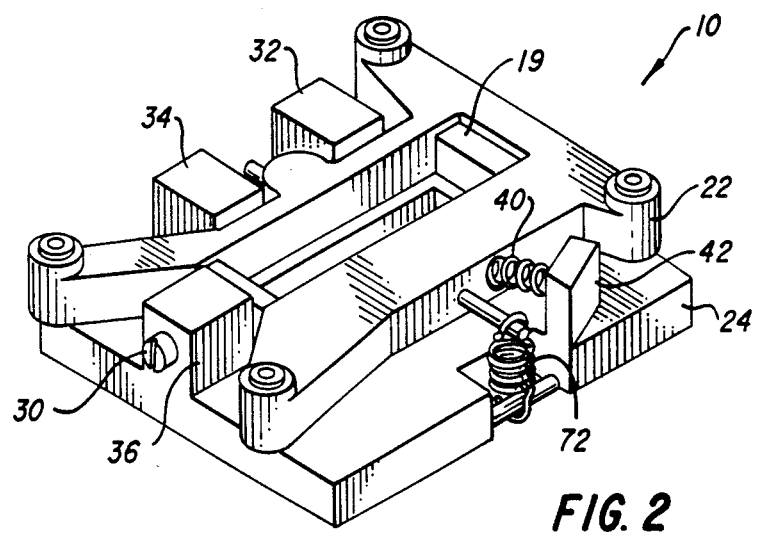
FIG. 2 is an isometric view showing the base and frame of the mount.

Adjustment of the array 14 along the optical axis 17 (Z axis) can be made by adjusting screws 62 and, 64. As shown in FIG. 74, screws 62 and 64 are threaded into frame 24 and bear against a bottom surface of base 22. Base 22 is also supported on a third screw 60 which is fixed in position and is not used in the adjustment of array 14. Base 22 is biased into contact with the screws 60, 62, and 64 by springs 70 and 72. (See FIGS. 2 and 4).

Figure 6:
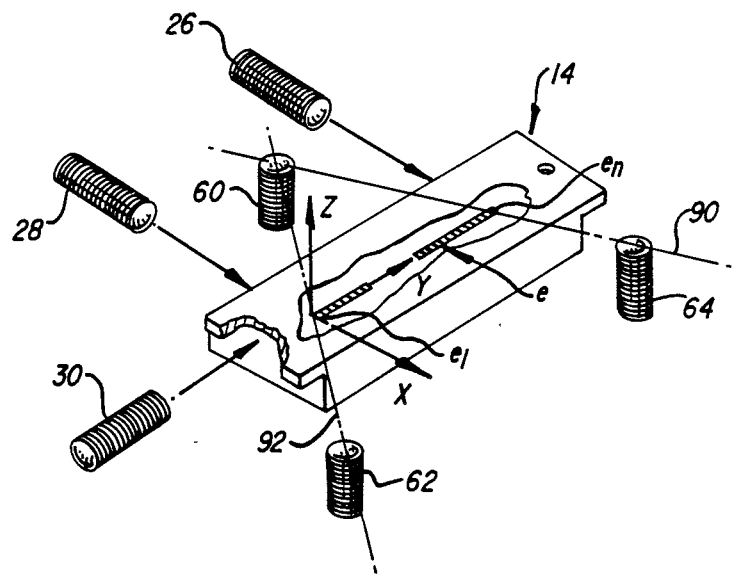
FIG. 6 is a schematic diagram illustrating the adjustments which can be made in the disclosed mount.

Adjustment of array 14 along the five degrees of freedom can best be understood by reference to FIGS. 1-4 and to the schematic diagram shown in FIG. 6. It will be seen, from FIGS. 3 and 6, that an adjustment of the array 14 in a cross-track direction (along the Y axis) can be made by turning screw 30. If an adjustment in the in-track direction (X axis) is desired, the array 14 can be moved by turning screws 26 and 28. As shown in FIGS. 3 and 6, screws 28 and 26 are located relative to array 14 such that they are in line with photosensitive elements $e_l$ and $e_n$, respectively. Elements $e_l$ and $e_n$ are located at the two extremities of the linear array of photosensitive elements e. As a result, one of the screws 26 or 28 can be moved to adjust the position of the element e adjacent that one screw, and such movement does not change the position of the element e adjacent the other of the screws.

In addition to the adjustment of the array 14 in the plane of the array along three degrees of freedom, adjustment of the array 14 can also be made about two rotational degrees of freedom in order to adjust the focus of the array along the Z axis. With reference to FIG. 6, angular adjustment of the array 14 can be made about an axis 90 by adjustment of screw 62; this adjustment will adjust the focus of the photosensitive element $e_l$ at the end of the array 14 adjacent screw 30. Angular adjustment of the array 14 can also be made about an axis 92 to adjust the focus of photosensitive element $e_n$ along the Z axis; this adjustment can be made by turning screw 64. Both axes 90 and 92 lie in the plane of the array 14, and in a preferred embodiment of the present invention axes 90 and 92 are orthogonal. Axis 90 extends between the rotational axes of screws 60 and 64, and axis 92 extends between the rotational axes of screws 60 and 62.

Figure 5:
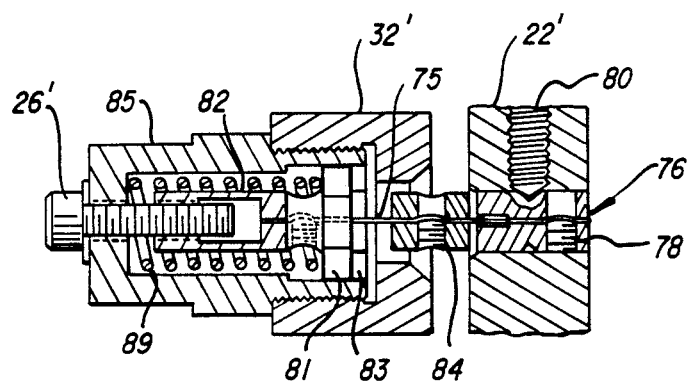
FIG. 5 is a cross-sectional view of second embodiment of the present invention.

In FIG. 5, there is shown a means for effecting movement of the array 14 along one degree of freedom for use in a second embodiment of the present invention. In all other respects, the second embodiment is the same as the embodiment discussed above. As shown in FIG. 5, a wire flexure 75 is secured at one end to a collar 76 by means of a set screw 78. The collar 76 is in turn secured in a base 22' by a set screw 80. Base 22' is adapted to receive a linear array of sensors (not shown). The wire flexure 75 is secured at an opposite end to a sleeve 82. A hexagonal end 81 on sleeve 82 is received in a hexagonal bore 83 in a cylindrical element 85 which is threaded into a boss 32'. A screw 26' is threaded into sleeve 82, and the position of base 22' can be changed by turning screw 26'. A spring 89 extends between end 81 and element 85 to reduce play between screw 26' and sleeve 82. The wire flexure 75 supports axial loads with high stiffness while allowing a moderate amount of radial displacement by bending in an "S" shape. A collar 84 located in the middle of the wire span reduces the Euler column length of the wire flexure 75 and thereby greatly increases its buckling strength under compressive load.

It will be apparent from the foregoing description that the optical mounts disclosed herein provide an efficient means for positioning the array 14 along five degrees of freedom. The contact points of the adjusting screws and the angle of the biasing spring are arranged such that adjustments of the array 14 can be made along one degree of freedom without moving the array in the other degrees of freedom.

The invention has been described in detail with particular reference to a preferred embodiment thereof, but it will be understood that variations and modifications can be effected within the spirit and scope of the invention.

I claim:

1. A mount for an optical device, said device including a column of photosensitive elements arranged along an axis, said mount comprising:
    means for supporting said device; and
    a plurality of adjustment means which are operable on said device for adjusting the position of said device relative to said supporting means in a plurality of degrees of freedom, each of said adjustment means being operable to adjust the position of said device in one degree of freedom without moving the device in the other degrees of freedom, one of said adjustment means being operable along said axis and another of said adjustment means being operable along a line which passes through a photosensitive element at one end of said column.

2. A mount for an optical device, as defined in claim 1, wherein said adjustment means are operable to adjust the device in five degrees of freedom.

3. A mount for an optical device, as defined in claim 1, wherein said device is a linear array of photosensitive elements disposed in a plane, and said adjustment means are operable to adjust the position of said device along three degrees of freedom in said plane.

4. A mount for an optical device, as defined in claim 1, wherein said adjustment means is operable to adjust said device about two axes which lie in said plane.

5. A mount for an optical device, said mount comprising:
    a base for receiving said device;
    a frame for supporting said base; and
    means for adjusting said base relative to said frame, said adjusting means including means for contacting said base at a plurality of points and means for biasing said base against said contacting means with equal force on each of said points.

6. A mount, as defined in claim 5, wherein said device is a linear array of photosensitive elements, and said contacting means contacts said array at points in line with the two linear extremities of said array.

7. A mount, as defined in claim 6, wherein said contacting means contacts said array at a point in line with said array of photosensitive elements.

8. A mount for an optical device, said mount comprising:
  base means for supporting said device;
  frame means for suporting said base means; and
  adjustment means for moving said base means relative to said frame to position said device, said adjustment means including threaded elements in said frame means which are operable on said base means, each of said threaded elements being movable to effect adjustment of the device along one degree of freedom without moving the device in any other degree of freedom.

9. A mount, as defined in claim 8, wherein said adjustment means includes three threaded elements which are operable to adjust the position of the device along three degrees of freedom in one plane.

10. A mount, as defined in claim 9, wherein means is provided for biasing said base means toward said three threaded elements with equal force on each of said elements.

11. A mount, as defined in claim 10, wherein said adjustment means includes two threaded elements which are operable to adjust the position of said device about two axes in said plane.

12. A mount, as defined in claim 11, wherein said axes are orthogonal.

13. A mount, as defined in claim 11, wherein spring means is provided for biasing said base means toward said frame means.

14. A mount for an optical device, said mount comprising:
  base means for supporting said device;
  frame means for supporting said base means; and
  adjustment means for moving said base means relative to said frame to position said device, said adjustment means including wire flexures for making a connection between said adjustment means and said base means.

15. A mount, as defined in claim 14, wherein said adjustment means includes threaded elements in said frame means which are operable to effect movement of said base menas, and said wire flexures extend between said threaded elements and said base means.

* * * * *

UNITED STATES PATENT AND TRADEMARK OFFICE
CERTIFICATE OF CORRECTION

PATENT NO. : 4,972,079

DATED : November 20, 1990

INVENTOR(S) : Douglass L. Blanding

Figure 4:
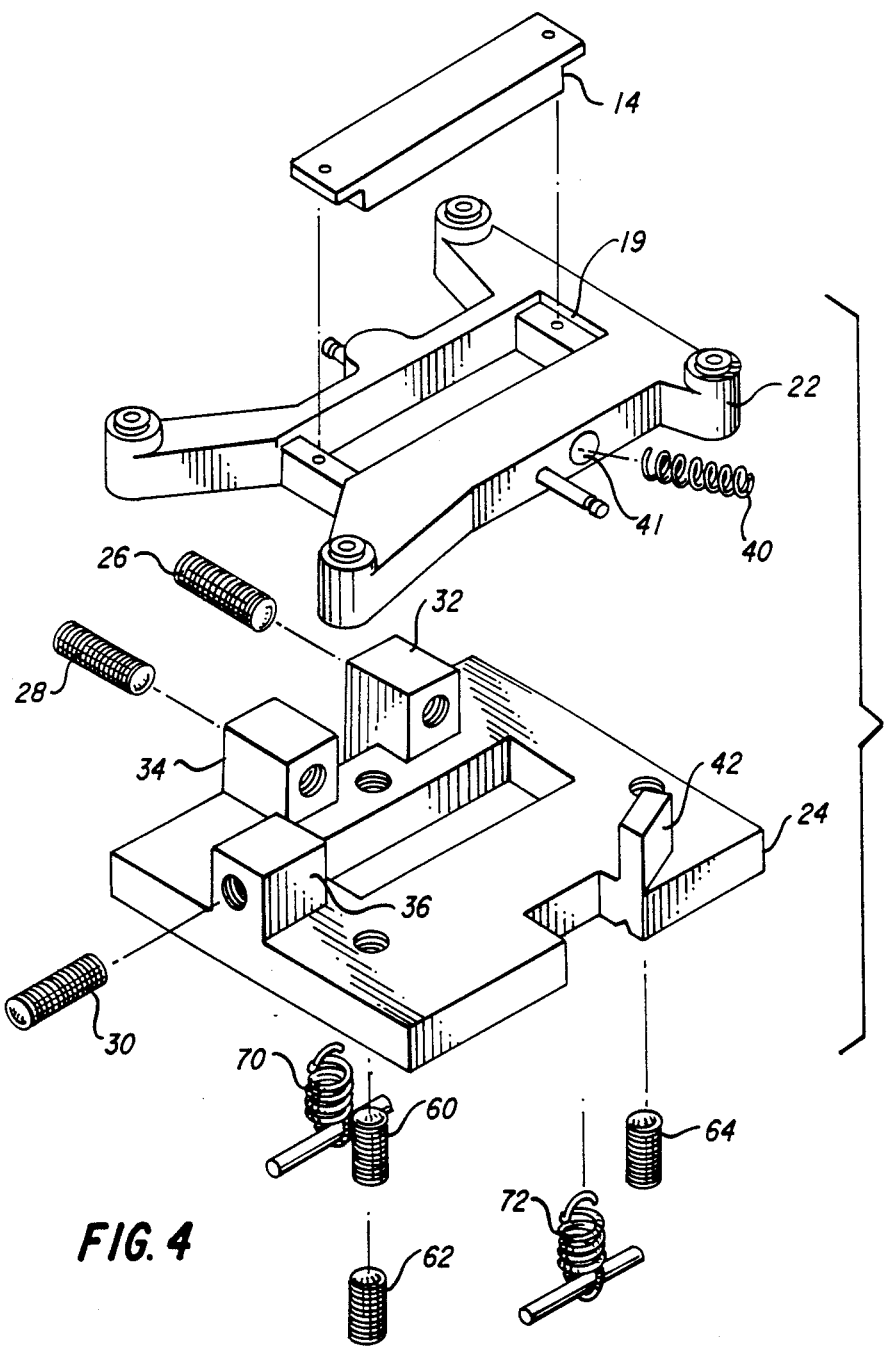
FIG. 4 is an exploded isometric view showing the mount of the present invention and an optical device which is supported in the mount.

It is certified that error appears in the above-identified patent and that said Letters Patent is hereby corrected as shown below:

Column 3, line 1, delete "E", and insert -- ) --;

line 5, should be deleted;

line 6, "array 1" should read -- array 14 --; and line 26, "FIG. 74" should read -- FIG. 4 --.

Signed and Sealed this

Fifth Day of May, 1992

Attest:

DOUGLAS B. COMER

*Attesting Officer*      *Acting Commissioner of Patents and Trademarks*